April 29, 1969 J. H. CAWLEY ETAL 3,441,901
SYSTEM FOR MEASURING SOUND VELOCITY IN WATER
AS A FUNCTION OF DEPTH
Filed Aug. 21, 1967

INVENTORS
JOHN H. CAWLEY
DANIEL SCHIFF

BY
Robert J. Potella
AGENT
D. E. Hodges
ATTORNEY

United States Patent Office 3,441,901
Patented Apr. 29, 1969

3,441,901
SYSTEM FOR MEASURING SOUND VELOCITY IN WATER AS A FUNCTION OF DEPTH
John H. Cawley, Lexington, and Daniel Schiff, Framingham Center, Mass., assignors, by mesne assignments, to the United States of America as represented by the Secretary of the Navy
Filed Aug. 21, 1967, Ser. No. 662,206
Int. Cl. H04b 13/00
U.S. Cl. 340—5            4 Claims

ABSTRACT OF THE DISCLOSURE

A freely sinking probe containing a transducer is launched from a moving vessel and connected thereto by a wire link. A sound transmitter aboard the vessel transmits an acoustic pulse into the water which is received by the transducer and transmitted to instrumentation through the wire link. The sound velocity as a function of the depth of the probe is computed and another acoustic pulse transmitted into the water.

---

This invention relates to apparatus for measuring the velocity of sound and more particularly to a device for measuring the velocity of sound in a body of water as a function of depth.

Whenever sonar is employed for tactical purposes such as anti-submarine warfare (ASW) it is desirable to know the velocity of sound within the ocean environment. The velocity of propagation of sound in sea water is affected by depth, temperature, salinity and other factors. Prior art techniques for determining the velocity of sound involved measuring the water temperature, salinity and other factors at given depths and then empirically finding the velocity. Such techniques are inherently inaccurate and time consuming since several parameters must be processed to yield a result.

Attempts have been made to measure the velocity directly within the medium itself. Such methods have heretofore been of limited success since complex electronic equipment was required to be placed within the water and the sound velocity could be measured only within a relatively small incremental area.

Accordingly, it is an object of the present invention to provide an improved system and method for measuring the velocity of sound propagation in water.

Another object of the present invention is to provide a system and method for obtaining a sound velocity profile (SVP) of ocean water.

A further object of the present invention is to provide a system and method for measuring sound velocity in water using an expendable freely sinking velocimeter launched from a moving vessel.

These and other objects of the present invention are achieved by providing a novel expendable sound velocimeter which is launched from either a ship or aircraft and produces a sound velocity profile. The velocimeter comprises a freely sinking probe containing a hydrophone which senses sound pulses emitted from a pinger associated with the ship or aircraft. The pinger transmits an acoustic pulse through the water which is received by the hydrophone and converted to an electrical impulse. The electrical impulse is transmitted along a wire link to suitable instrumentation to calculate sound velocity as a function of depth.

Figure 1:
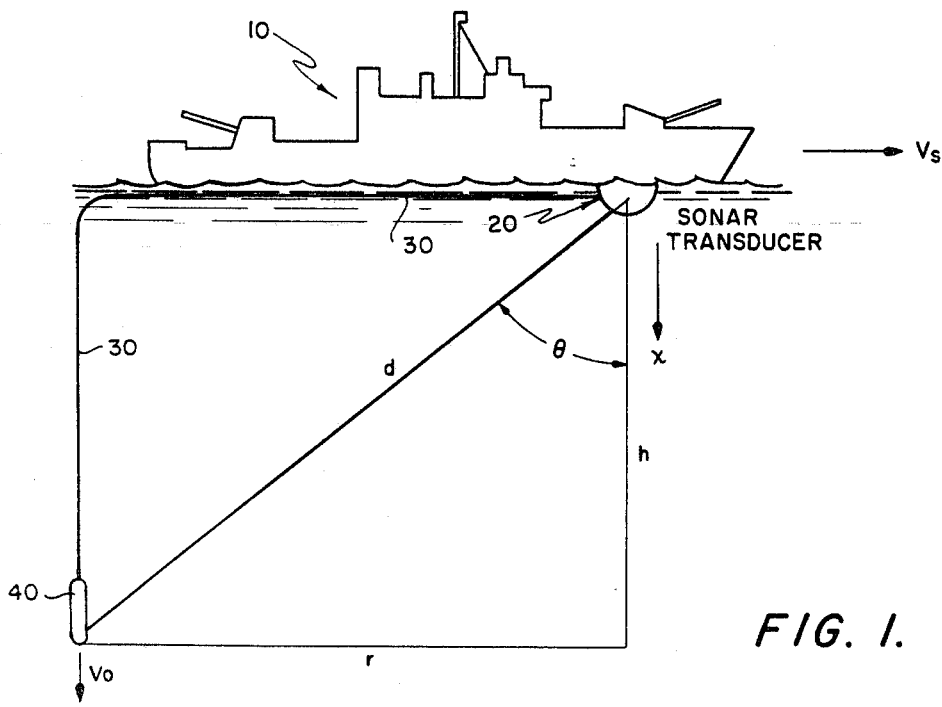
Figure 2:
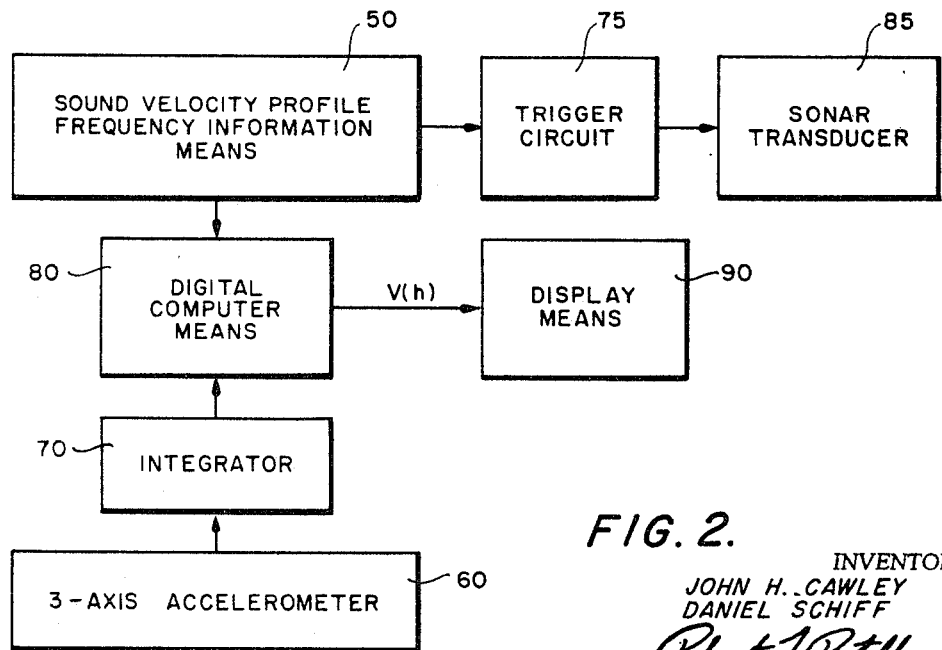

These and other objects and advantages of the present invention will become apparent from the following detailed specification in conjunction with the accompanying drawings wherein:

FIG. 1 is a diagrammatic representation of the expendable sound velocimeter in use; and
FIG. 2 is a block diagram of the components used for obtaining the sound velocity profile.

Referring now to FIG. 1, the invention comprises a freely sinking probe 40 which may be launched from either a moving ship 10 or from aircraft such as a helicopter into the water. The probe 40 may comprise a casing of any suitable shape capable of supporting a hydrophone therein. The hydrophone may consist of a suitable transducer (such as piezoelectric device) for converting acoustic pulses to electrical signals. As an example, the towed hydrophone disclosed in U.S. Patent No. 2,906,992, issued July 23, 1963, may be advantageously utilized in this invention. Hydrophones are well known in the art and other suitable types will suffice for the purposes of this invention.

The probe 40 is connected by means of a wire cable 30 to the launching vessel 10. It is advantageous to reduce the amount of drag on the wire cable 30 as much as possible thereby permitting the cable to remain motionless in the water as the vessel 10 proceeds and the probe 40 sinks. Consequently, separate winding reels, not shown, may be provided on both the probe 40 and vessel 10 to achieve this object. An example of such a system is disclosed in U.S. Patent No. 3,148,651, issued September 15, 1964, however other suitable configurations may be utilized.

Mounted on the vessel 10 is a sonar transducer or pinger 20 which is capable of transmitting short, sharp acoustic pulses into the water. The acoustic pulses are propagated through the water medium and eventually reach the hydrophone mounted within probe 40. The hydrophone receives the acoustic pulse and converts it to a corresponding electrical signal which is transmitted along the conductive wire cable 30 to the signal instrumentation equipment stationed aboard the vessel 10. The instrumentation processes the signal, as hereinafter described, to yield the sound velocity information and causes the sonar transducer 20 to transmit another acoustic pulse into the water where it is again received by a probe 40 and processed.

The sound velocity $v(h)$ at any given depth $h$ is determined from the time $T(h)$ required for a signal to travel from the sonar transducer 20 through the water to the probe 40. In FIG. 1, $h$ represents the instantaneous depth of the probe 40 and $d$ represents the path length of sound propagation from the sonar transducer 20 to the probe 40. $V_0$ is the sink rate of the probe and the velocity of the vessel is $V_s$. The angle $\theta$ represents the angle between $d$ and $h$ and $r$ the third leg of the right triangle formed therewith. Depth is measured in the $x$ direction as shown.

Accordingly, the transmission time $T(h)$ for a signal to travel through the water may be shown to be:

$$(Th) = \frac{1}{\cos \theta_\mathrm{h}} \int_0^\mathrm{h} \frac{dx}{v(x)} \qquad (1)$$

where $v(x)$ is the sound velocity at the instantaneous depth $x$. Differentiation of the equation with respect to $h$ yields:

$$\frac{dT(h)}{dh} = \frac{\sin \theta_\mathrm{h}}{\cos^2 \theta_\mathrm{h}} \cdot \frac{d\theta_\mathrm{h}}{dh} \int_0^\mathrm{h} \frac{dx}{v(x)} + \frac{1}{\cos \theta_\mathrm{h} \cdot v(h)} =$$

$$T(h) \cdot \tan \theta_\mathrm{h} \cdot \frac{d\theta_\mathrm{h}}{dh} + \frac{1}{\cos \theta_\mathrm{h} \cdot v(h)} \qquad (2)$$

Rearranging the equation to yield the sound velocity at depth $h$:

$$v(h) = \frac{1}{\cos\theta_n \left(\frac{dT(h)}{dh} - T(h)\cdot\tan\theta_h \cdot \frac{d\theta_h}{dh}\right)} \quad (3)$$

Letting the sink rate $V_0$ and velocity of the vessel $V_s$ be constants, then the angle $\theta$ is given by:

$$\cos\theta = \frac{V_0}{(V_0^2 + V_s^2)^{1/2}} \quad (4)$$

For this case, $d\theta_h/dh = 0$ and $v(h)$ is given by:

$$v(h) = \frac{1}{\frac{dT(h)}{dh}\cdot\cos\theta} \quad (5)$$

For a probe with a constant sink rate:

$$h = v_0 \cdot t \quad (6)$$

where $t$ is the time for the probe to sink from the time of launching to depth $h$. In addition, $$T(h) = \frac{1}{f(h)} \quad (7)$$

where $f(h)$ is defined as the number of times per second a signal could travel back and forth between the sonar transducer and the hydrophone. Substituting Equations 6 and 7 into Equations 4 and 5 yields:

$$v(h) = \frac{-V_0 \cdot f^2(h)}{\frac{df(h)}{dt}\cdot\cos\theta} \quad (8)$$

The hydrophone contained within probe 40 is tuned to the frequency of sonar transducer 20 which transmits acoustic pulses which are sharply shaped and of short duration. The wire link 30 transmits the electrical impulse corresponding to the received acoustic pulse to circuitry aboard vessel 10 which initiates another acoustic pulse as hereinafter described. Consequently, the frequency of the acoustic pulses is inversely proportional to the time required for the acoustic pulse to travel from vessel 10 to the probe 40.

Referring now to FIG. 2, the instrumentation required to suitably process the signals for extracting sound velocity data comprises sound velocity profile frequency information means 50 which represents the electrical impulses transmitted along wire 30 from probe 40 along with any required auxiliary processing means such as amplification stages as well as the additional parameters set forth in the equation. The output of the SVP frequency information means 50 is fed to digital computer means 80 for computing the value of the sound velocity as well as to trigger circuit 75. Also connected to the digital computer means 80 is an integrator 70 which is fed from the output of a three-axis accelerometer 60 on vessel 10. The output of the digital computer means 80 is fed to display means 90 and the output of the trigger circuit 75 is fed to sonar transducer 85.

The above-described circuitry enables the value of sound velocity to be determined from Equation 8. As an example, assume that the SVP at a 1500 foot depth is required. Let the sink rate $V_0 = 20$ ft./sec. and the vessel velocity $V_s = 50$ ft./sec. (corresponding to 30 knots). The total length of wire 30 is $$h + \frac{V_s}{V_0}h$$

or 5250 ft. The time required for the electrical impulse to travel from probe 40 through wire 30 is approximately 6 microseconds; during this period of time an acoustic pule will travel about 0.03 ft. through ocean water. Accordingly, the electrical signal transmission time is negligible compared to the acoustic signal transmission time and the one-way acoustic transmission time used to obtain Equation 7 is a valid approximation. Inserting the above values into the above equations and using a typical value of 5000 ft./sec. for ocean sound velocity yields the frequency of signal travel between the vessel and probe $f$ as a function of the probe depth $h$; or $$f = \frac{1860}{h} Hz$$

Thus $f$ will change from 186 Hz. at a 10 ft. depth to slightly over 1 Hz. at the full 1500 ft. depth. This yields a depth resolution of about 20 ft. at the 1500 ft. depth which improves at shallower depths to about 2 ft. at the 185 ft. depth.

The digital computer means 80 can directly compute the SVP by appropriately programming the above equations therein. Furthermore, the three-axis accelerometer 60 mounted on the vessel 10 can be used to correct for variations in the relative velocity between the sonar transducer and probe due to the motion of the vessel as a result of heave, roll, pitch and yaw. The accelerometer cancels out variations in the relative $V_0$ and $V_s$ by passing the output through an integrator 70 thus yielding constant value for $V_0$ and $V_s$. The output of integrator 70 is similarly programmed into the computer means 80. The computed value of the SVP from computer means 80 is fed to any suitable display means 90 such as a graphic recorder for utilization. In addition, as an electrical impulse is received by the sound velocity profile frequency information means 50 it is fed to trigger circuit 75 which initiates another acoustic pulse transmitted from sonar transducer 85.

The SVP thus obtained is very precise if the values of $V_0$ and $V_s$ are reasonably constant, even though their absolute magnitudes are not known. Further accuracy may be achieved by measuring the sound velocity near the water surface with an accurate velocimeter and correlating this value with that obtained with the system herein described. Furthermore, accuracy can be further increased by subdividing each repetition rate cycle into a suitably large number of increments.

Having described the invention, it will be apparent that many modifications will be obvious to one skilled in the art and, consequently, the scope of the invention is to be measured solely by the following claims.

What is claimed is:

1. A system for measuring the velocity of sound in a liquid medium as a continuous function of depth comprising:

acoustic pulse propagating means;
   transducer means for receiving and converting the received acoustic pulses to corresponding electrical signals;
   said transducer means and said pulse propagating means being movable with respect to each other;
   conducting means for conducting said electrical signals; and
   computer means connected to said conducting means and responsive to the time interval between the propagation of said acoustic pulses and the receiving and converting of said acoustic pulses into electrical signals;
   the relative displacement between said transducer means and said pulse propagating means increasing with time;
   said transducer means comprising a freely sinking body immersed in a liquid medium the sound velocity of which is to be measured;
   said acoustic pulse propagating means being disposed in proximity to the surface of said liquid medium;
   said computer means computing the velocity of sound in said liquid medium as a function of the depth of said transducer means;
   said acoustic pulse propagating means having a component of velocity with respect to said liquid medium;
   said computer means measuring the time rate of change of the number of times per second said acoustic pulse travels between said acoustic pulse propagating means and said transducer means;

whereby the velocity of said acoustic pulses is computed.

2. A system for measuring the velocity of sound in a liquid medium as a function of depth as set forth in claim 1 further including:

accelerometer means mounted together with said acoustic pulse propagating means and connected to said computer means for cancelling out variations in the relative velocities of said acoustic pulse propagating means and said transducer means.

3. A system for measuring the velocity of sound in a liquid medium as a function of depth as set forth in claim 2 wherein:

said accelerometer means is connected through integrating means to said computer means.

4. A system for measuring the velocity of sound in a liquid medium as a function of depth as set forth in claim 3 further including:

trigger means for initiating acoustic pulses from said pulse propagating means in response to the receipt of said electrical signals.

References Cited

UNITED STATES PATENTS

| 3,100,885 | 8/1963 | Welkowitz et al. | 340—3 |
| 3,273,111 | 9/1966 | Parenti | 340—5 |

FOREIGN PATENTS

| 619,964 | 5/1961 | Canada. |

RICHARD A. FARLEY, *Primary Examiner.*

U.S. Cl. X.R.

181—.5